United States Patent
Lewis et al.

(10) Patent No.: US 11,308,531 B2
(45) Date of Patent: Apr. 19, 2022

(54) APPLICATION RATING AND FEEDBACK

(71) Applicant: GOOGLE LLC, Mountain View, CA (US)

(72) Inventors: Justin Lewis, Marina Del Rey, CA (US); Scott Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 93 days.

(21) Appl. No.: 16/607,690

(22) PCT Filed: Apr. 11, 2018

(86) PCT No.: PCT/US2018/027151
§ 371 (c)(1),
(2) Date: Oct. 23, 2019

(87) PCT Pub. No.: WO2018/200207
PCT Pub. Date: Nov. 1, 2018

(65) Prior Publication Data
US 2020/0134679 A1 Apr. 30, 2020

Related U.S. Application Data

(60) Provisional application No. 62/490,446, filed on Apr. 26, 2017.

(51) Int. Cl.
G06F 3/0484 (2013.01)
G06F 9/54 (2006.01)
(Continued)

(52) U.S. Cl.
CPC ......... G06Q 30/0282 (2013.01); G06F 9/542 (2013.01); G06F 3/0482 (2013.01); G06F 3/0484 (2013.01)

(58) Field of Classification Search
CPC ... G06Q 30/0282; G06F 9/542; G06F 3/0482; G06F 3/0484
See application file for complete search history.

(56) References Cited

U.S. PATENT DOCUMENTS 7,860,803 B1 * 12/2010 Chang .................. G06Q 20/367
705/65
8,108,255 B1 * 1/2012 Robinson ........... G06Q 30/0631
705/14.44
(Continued)

FOREIGN PATENT DOCUMENTS

WO 2013095348 A1 6/2013
WO 2016151470 A1 9/2016

OTHER PUBLICATIONS

International Search Report and Written Opinion dated Jun. 28, 2018, on application No. PCT/US2018/027151.

Primary Examiner — Andrew T Chiusano
(74) Attorney, Agent, or Firm — Lowenstein Sandler LLP

(57) ABSTRACT

Implementations disclose personalized interruptive dialogs for application rating and sharing. A method includes identifying a first application for which a feedback of a user of a user device is desired; determining by a processing device, whether previous user interactions with one or mole second applications indicate that the user is interested in providing feedback for the one or more second applications; and responsive to determining that the previous user interactions with the one or more second applications indicate that the user is interested in providing the feedback for the one or more second applications, causing the user device to display, to the user, a prompt for the feedback for the first application.

19 Claims, 6 Drawing Sheets

(51) Int. Cl.
*G06Q 30/02* (2012.01)
*G06F 3/0482* (2013.01)

(56) References Cited

U.S. PATENT DOCUMENTS

| | | | |
|---|---|---|---|
| 10,217,142 B1* | 2/2019 | Chordia | G06Q 30/0282 |
| 10,365,798 B1* | 7/2019 | El Kaissi | G06F 3/0484 |
| 2005/0216329 A1* | 9/2005 | Handy-Bosma | G06Q 30/0277 |
| | | | 709/225 |
| 2014/0026062 A1* | 1/2014 | Proudfoot | G06Q 30/00 |
| | | | 715/740 |
| 2014/0372980 A1* | 12/2014 | Verma | G06F 9/4451 |
| | | | 717/121 |
| 2015/0170172 A1* | 6/2015 | Gichuhi | G06Q 30/02 |
| | | | 705/7.32 |
| 2015/0338918 A1 | 11/2015 | Cardonha et al. | |
| 2016/0066120 A1 | 3/2016 | Lee | |
| 2016/0103922 A1* | 4/2016 | Ilic | H04L 51/32 |
| | | | 707/751 |
| 2016/0189173 A1* | 6/2016 | King | G06Q 30/0201 |
| | | | 705/7.29 |
| 2017/0039507 A1* | 2/2017 | Anbil Parthipan | |
| | | | G06Q 10/063118 |
| 2017/0103073 A1* | 4/2017 | Ben-Tzur | G06Q 30/0282 |
| 2017/0109838 A1* | 4/2017 | Byron | G06Q 50/01 |
| 2018/0025393 A1* | 1/2018 | Scheel | G06Q 30/0201 |
| | | | 705/7.29 |
| 2018/0176885 A1* | 6/2018 | VanBlon | H04L 51/24 |
| 2018/0247347 A1* | 8/2018 | McNabb | G06Q 30/0282 |

* cited by examiner

APPLICATION RATING AND FEEDBACK

TECHNICAL FIELD

This disclosure relates to the provision of user feedback on an application such as a mobile application.

BACKGROUND

A user who acquires an application (or "app") may be asked to provide feedback on the application to allow the application to be improved, for example by allowing users to report problems ("bugs") in the application. One known way to obtain feedback is to prompt the user of an application to rate or share an application. However, sending prompts to users to ask them to rate or share an application or otherwise provide feedback on the application can be inefficient, and also may be annoying to users.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes identifying a first application for which a feedback of a user of a user device is desired, determining, by a processing device, whether previous user interactions with one or more second applications indicate that the user is interested in providing feedback for the one or more second applications, and responsive to determining that the previous user interactions with the one or more second applications indicate that the user is interested in providing the feedback for the one or more second applications, causing the user device to display, to the user, a prompt for the feedback for the first application. If a user does not respond to a prompt, all network resources used in sending the prompt to the user's device are wasted and this can lead to inefficient use of network resources (particularly if multiple prompts are sent to one user to provide feedback about a particular application). By providing prompts only to users that are likely to respond by providing feedback on a mobile applications and/or to users that are likely to share mobile applications, aspects of the present disclosure have technological advantages of reduced bandwidth, reduced energy consumption (e.g., battery consumption), and reduced latency.

In one implementation, the prompt for the feedback for the first application is a request to rate or share the first application.

In one implementation, the previous user interactions include one or more ratings, by the user via one or more prompts, of the one or more second applications and the determining that the previous user interactions indicate that the user is interested in providing the feedback comprises determining a quantity of the one or more ratings meets a threshold quantity.

In one implementation, the previous interactions include a level of engagement of the user with the first application and the determining that the previous user interactions indicate that the user is interested in providing the feedback comprises determining the level of engagement meets a threshold level.

In one implementation, the previous user interactions include one or more ratings, by the user via one or more prompts, of the one or more second applications and a level of engagement of the user with the first application and the determining that the previous user interactions indicate that the user is interested in providing the feedback comprises generating a combined score based on the one or more ratings and the level of engagement and determining the combined score meets a threshold score.

In one implementation, the previous user interactions include one or more negative interactions comprising at least one of dismissing a corresponding prompt to rate the one or more second applications, a level of engagement of the user with the first application does not meet a threshold level, or a rating for the one or more second applications does not meet a threshold rating and does not have an accompanying comment and the determining that the previous user interactions indicate that the user is interested in providing the feedback comprises determining a quantity of negative interactions does not meet a threshold quantity.

In one implementation, the method further includes receiving user information corresponding to a plurality of users comprising the user and clustering, based on the user information, a subset of the plurality of users comprising the user into a first cluster. The previous user interactions include a first median positive interaction rate of the first cluster and the determining that the previous user interactions indicate that the user is interested in providing the feedback comprises determining the first median positive interaction rate meets a threshold rate.

In one implementation, the method further includes determining a level of impact for displaying the prompt to the user based on the previous user interactions. The level of impact comprises at least one of invasiveness of the prompt, size of the prompt, or location of the displaying of the prompt. The causing the user device to display, to the user, the prompt is based on the level of impact.

In one implementation, the one or more second applications include the first application.

In one implementation, the first application is different from any of the one or more second applications.

In one implementation all features of the method may be performed by the processing device. The processing device may be the processing device of a user device.

In an aspect of the disclosure, a method includes transmitting, by a user device of a user, previous user interactions of the user with one or more second applications, receiving, by the user device, instructions to display a prompt associated with a first application to the user responsive to the previous user interactions with the one or more second applications indicating that the user is interested in providing the feedback for the one or more second applications, and displaying, by the user device, the prompt associated with the first application to the user.

In an aspect of the disclosure, a non-transitory machine-readable storage medium stores instructions which, when executed cause a processing device of a user device to perform operations comprising: identifying a first application for which a feedback of a user of a user device is desired; determining, by the processing device, whether previous user interactions with one or more second applications indicate that the user is interested in providing feedback for the one or more second applications; and responsive to determining that the previous user interactions with the one or more second applications indicate that the user is interested in providing the feedback for the one or more second applications, causing the user device to display, to the user, a prompt for the feedback for the first application.

In an aspect of the disclosure, a system comprises: a memory; and a processing device, coupled to the memory, configured to perform a method according to any aspect or implementation described herein. In an aspect of the disclosure, a system comprises: a processor-readable memory; and a processing device, coupled to the memory. The processor-readable memory, which may be a non-transitory memory although this aspect is not limited to this, stores instructions that, when executed by the processing device, cause the processing device to perform a method according to any aspect or implementation described herein.

In an aspect of the disclosure, a processor-readable memory, which may be a non-transitory memory although this aspect is not limited to this, stores instructions that, when executed by the processing device, cause the processing device to perform a method according to any aspect or implementation described herein

BRIEF DESCRIPTION OF THE DRAWINGS

The present disclosure is illustrated by way of example, and not by way of limitation, in the figures of the accompanying drawings.

DETAILED DESCRIPTION

Figure 1:
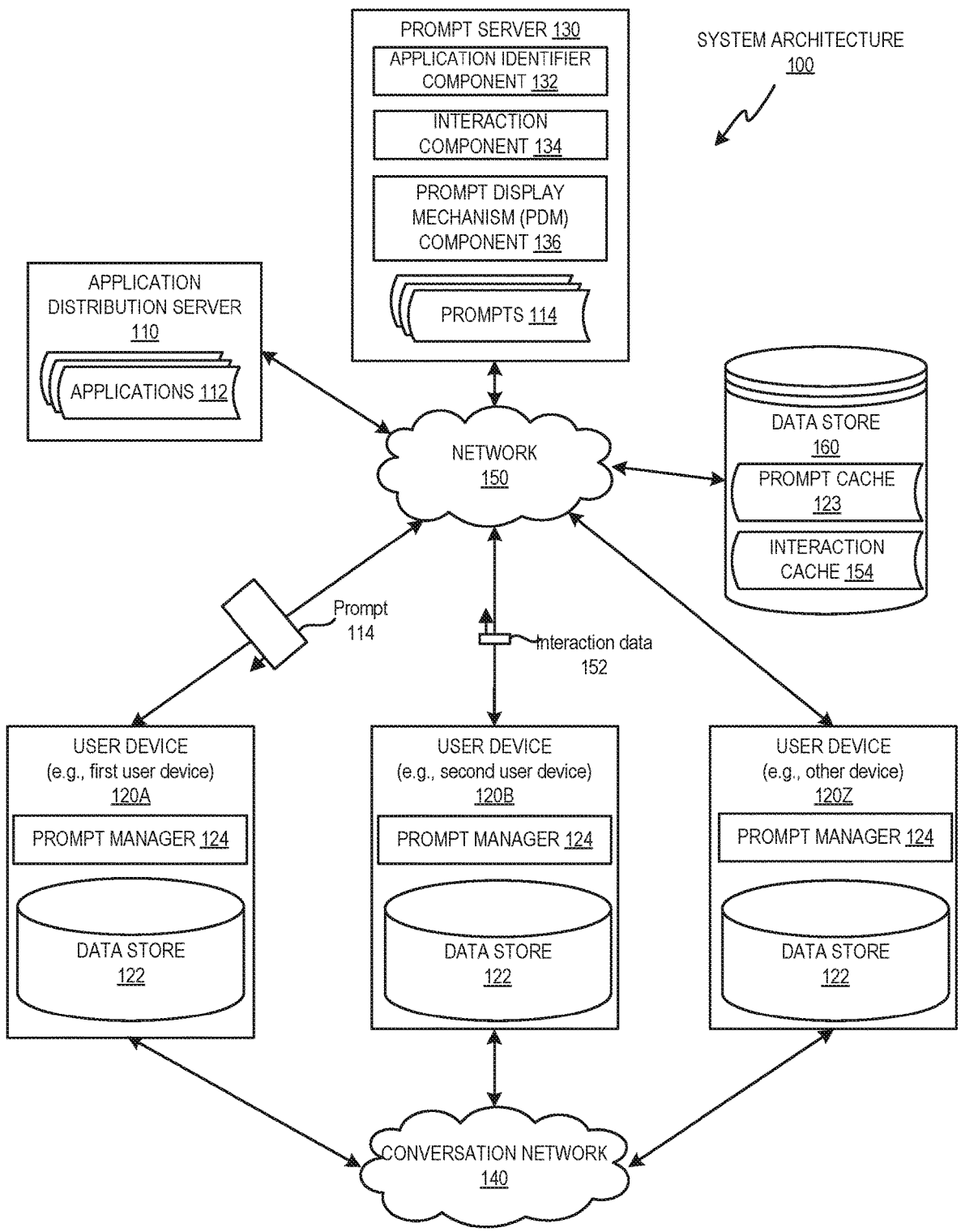
FIG. 1 is a block diagram illustrating an exemplary system architecture, in accordance with an implementation of the disclosure.

Aspects and implementations of the disclosure are directed to personalized interruptive dialogs (e.g., prompts) for rating and sharing of applications (e.g., mobile applications, software applications, etc.). User acquisition (e.g., downloading, purchasing) of an application may increase as the application is shared, as the average rating of the application increases, and as the number of ratings of the application increases. The average rating and number of ratings of an application may determine where an application appears in relation to other applications in an application distribution platform (e.g., high in a list in an application (app) store, on a trending applications list in an app store, on a top charts list in an app store, on a most downloaded list in an app store, etc.). User acquisition of an application may increase as the location of the application in the application distribution platform improves (e.g., the higher the application is on an app-store listing, the lists in which the application is located, etc.).

A user may frequently receive prompts to rate applications on an application distribution platform (e.g., via an app store) or to share applications. A prompt may be displayed in conjunction with an application (e.g., an application may ask for a rating in-app) and may only direct the user to the application distribution platform if the rating is positive. If developers have confidence that an application is well-liked, the developers may ask all users to leave a rating or share the application. As used herein, "sharing an application" may refer to sharing information about an application, sharing a link to download an application, sharing a promotional message about an application, etc.

A small percentage of users rate applications (e.g., 1:1500 ratings per download for free applications, 1:60 ratings per download for expensive applications).

Being prompted to share or rate an application may be an annoying experience for users. Users who are annoyed by prompts may close the prompt without rating or sharing the application. A user that is annoyed by a prompt may leave a poor rating (e.g., a negative review in the rating) that reflects the opinion of the user of the prompt instead of the opinion of the user of the application.

Some users are not annoyed by prompts and are willing to leave honest ratings or share the application. Users that have rated many applications in the past are likely to rate applications in the future.

By not providing prompts to users, application acquisition may decrease (e.g., due to lack of ratings and lack of sharing of the application). By providing prompts to all users, there may be reduced retention of users that are annoyed by prompts (e.g., users may stop using or delete the application), the opinion of users that are annoyed by prompts may be negatively affected, and the ratings may not reflect an honest rating.

Aspects of the present disclosure address the above and other deficiencies by providing personalized interruptive dialogs (e.g., prompts) for rating and sharing of applications to users that are likely to provide honest ratings or share the applications. In one implementation, the prompts are provided to a user based on the interaction data of the user with applications. In another implementation, prompts are provided to a user based on interaction data of other users that are associated with the user (e.g., the user and the other users can be grouped together based on similar interests and/or other similarities). In one example, a prompt server may cause a prompt for taking an action with a current application (e.g., rating or sharing the current application) to be displayed via a user device of a user that commonly takes the action with other applications. In another example, a prompt server may cause a prompt for taking an action with a current application to be displayed via a user device of a user that is associated with (e.g., in the same group or cluster as) other users that commonly take the action with applications. The prompt server may seldom cause a prompt for taking an action to be displayed to a user device of a user that does not commonly take the action with other applications. The user device may be a mobile device (e.g., phone, tablet, laptop, smart watch, etc.), a laptop, a desktop, a smart television, etc. and may be capable of displaying a prompt to a user and receiving interaction with the prompt and applications from the user.

In one example, an application may be part of a family of applications (e.g., applications of the same application provider, applications associated with each other, etc.). If a user leaves a rating for first and second applications of a family of applications, the user is likely to receive a prompt requesting a rating for a third application of the family of applications. If a user shared applications from the family of applications, the user may receive a prompt asking the user to share applications in the family of applications (e.g., share or re-share applications in the family of applications). If a user dismissed a prompt asking for a rating for an application of the family of applications, the user is less likely to receive a prompt asking for a rating for another application of the family of applications.

The user may be requested to provide a rating by a prompt displayed in conjunction with the application (e.g., provide the rating in-app) before being directed to an application distribution platform or the user may be taken directly to the application distribution platform.

In one implementation, users that commonly leave ratings for applications of an application distribution platform may be identified and a third party (e.g., third-party application developers) may be informed to prompt the users for ratings.

Accordingly, by providing prompts for feedback for a particular mobile application only to users that are likely to provide feedback on the application and/or to users that are likely to share mobile applications, aspects of the present disclosure facilitate a substantial increase in the number of responses to feedback requests/sharings of mobile applications while requiring no more, and probably fewer, network resources. As a result, of the increased feedback the developers of the application can incorporate improvements in the application (and/or in other applications they develop). This leads to higher quality applications and, as a result, significantly more users access applications and download them. This in turn increases the popularity of the application distribution platform making use of the present disclosure among application developers/vendors.

By providing prompts for feedback for a particular mobile application only to users that are likely to provide feedback on the application and/or to users that are likely to share the mobile applications, aspects of the present disclosure have technological advantages of reduced bandwidth, reduced energy consumption (e.g., battery consumption), and reduced latency. The technological advantages may result from causing prompts to only be displayed to users that are likely to provide feedback and/or share mobile applications instead of causing prompts to be displayed to all users. Selectively causing prompts to be displayed requires less bandwidth, energy consumption, and latency than causing prompts to be displayed to all users.

Providing prompts for feedback for a particular mobile application only to users that are likely to provide feedback and/or that are likely to share mobile applications increases the reliability of content delivery systems, and reduces or eliminates the need for manual checking of the results of such techniques. In addition, conventional techniques may result in transmitting prompts to users that are not likely to provide feedback for mobile applications and/or share mobile applications, which may lead to additional operations (e.g., one or more of repeating transmission of the prompts, receiving repeated rejections of the prompts by users, receiving negative ratings from users based on annoyance with the prompts, deleting of the applications by the users responsive to annoyance with the prompts, etc.). Thus, by selecting a user to which a prompt is to be provided that is likely to respond to the prompt by providing feedback and/or share the application, aspects of the present disclosure eliminate the need for the above additional operations, thereby resulting in more efficient use of computing (processing) resources and in improved user experience.

FIG. 1 illustrates an example system architecture 100, in accordance with one implementation of the disclosure. The system architecture 100 includes application distribution server 110, user devices 120A-Z, prompt server 130, a network 150, and a data store 160.

Application distribution server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components. The application distribution server 110 may be used to provide a user with access to applications 112 (e.g., the application distribution server 110 may host the applications 112). The application distribution server may provide the applications 112 to the user (e.g., a user may select an application 112 (e.g., in the app store) and download the application 112 from the application distribution server 110 in response to requesting or purchasing the application 112). Application distribution server 110 may be a part of an application distribution platform (e.g., application distribution service) that may allow users to consume, develop, upload, download, rate, share, search for, approve of ("like"), dislike, and/or comment on applications 112. The application distribution platform may also include a website (e.g., a webpage) or application back-end software that may be used to provide a user with access to the applications 112.

Application distribution server 110 may host content, such as applications 112. Applications 112 may be digital content chosen by a user, digital content made available by a user, digital content developed by a user, digital content uploaded by a user, digital content developed by a content provider (e.g., application developer), digital content uploaded by a content provider (e.g., application developer), digital content provided by the application distribution server 110, etc. Examples of applications 112 include, and are not limited to, mobile applications, desktop applications, software applications, etc. Applications 112 may include (e.g., display) social media updates, digital video, digital movies, digital photos, digital music, website content, social media updates, electronic books (eBooks), electronic magazines, digital newspapers, digital audio books, electronic journals, web blogs, real simple syndication (RSS) feeds, electronic comic books, software applications, etc.

Applications 112 may be consumed via a web browser and/or via an app store on the user device 120. As used herein, "application," "mobile application," "desktop application," "software application," "digital content," "content," and "content item," can include an electronic file that can be executed or loaded using software, firmware or hardware configured to present the application 112 to an entity. In one implementation, the application distribution platform may store the applications 112 using the data store 160. In one example, application 112 may be presented to and/or downloaded by a user of user device 120A.

In some implementations, system architecture 100 may also include a prompt server 130 coupled to user devices 120A-120Z via network 150 to cause the user devices 120A-120Z to display prompts 114. In one implementation, prompt server 130 may be part of the application distribution platform and/or application distribution server 110. In another implementation, prompt server 130 may be an independent platform including one or more computing devices such as a rackmount server, a router computer, a server computer, a personal computer, a mainframe computer, a laptop computer, a tablet computer, a desktop computer, etc.

Prompt server 130 may include an application identifier component 132, an interaction component 134, and a prompt display mechanism (PDM) component 136 as described in more detail herein.

Application identifier component 132 may identify an application 112 for which feedback of a user is desired. A user may have downloaded the application 112 from the application distribution server 110 to a user device 120 of the user. In one implementation, application identifier component 132 may be notified by the application distribution server 110 that the user of the user device 120 downloaded the application and may determine that previous ratings and/or sharings of the application are below a threshold.

Interaction component 134 may determine whether previous user interactions (e.g., interaction data 152 of the user, interaction data 152 of users associated with (clustered with) the user) indicate that the user is interested in providing additional feedback for applications 112 (e.g., feedback for a recently downloaded application 112 or feedback for a previously downloaded application 112 for which the user has not provided any feedback yet). Interaction component 134 may determine interactions (e.g., interaction data 152) of the user of the user device 120 with one or more applications 112 by collecting and storing feedback provided by the user for applications 112 (interaction data 152) in interaction cache 154 of data store 160.

Interaction component 134 may collect interaction data 152 from one or more user devices 120 of the user.

In one implementation, user device 120 may download the application 112 from the application distribution server 110 and execute the application 112 on the user device 120 (e.g., execute application 112 with or without access to network 150, execute the application 112 offline, etc.). The user device 120 may include a prompt manager 124 (e.g., a module or a plugin of an operating system of the user device 120) that receives a prompt for user feedback from the prompt server 130 with instructions to present this prompt at a predetermined event during the operation of the application 122 (e.g., when the user requests to start or end the application, after a predetermined time interval from the start of the application, after completing a predetermined level in the application, etc.). The prompt manager 124 may monitor operation of the application 112 and/or user requests during the operation of the application, and detect, based on the above monitoring, an occurrence of the predetermined event. In response to such an occurrence, the prompt manager 124 may present the prompt to the user at the predetermined event, receive user response to the prompt (e.g., dismissal of the prompt, an application rating provided by the user, an application sharing provided by the user, etc.), and store this response as interaction data 152 in data store 122. The prompt manager 124 may then transmit the interaction data 152 (e.g., periodically, when connected to network 150, etc.) to interaction component 134 via network 150. In one example, when the user responds to the prompt by agreeing to share the application 112, the prompt manager 124 (in addition to storing this response in data store 122) also enables the sharing of the application 112 with one or more other users (e.g., by sending a link to download the application 112, a promotional message about the application 112, etc. to the other users via conversation network 140 or network 150). In another example, the prompt manager 124 does not participate in the actual sharing of the application but merely provides the application sharing response of the user to the prompt server 130 (e.g., as part of interaction data 152 or separately).

In an alternative implementation, the application 112 may include instructions to present the prompt to the user at a predetermined event (e.g., when the user requests to start or end the application, after a predetermined time interval from the start of the application, after completing a predetermined level in the application, etc.), and to store the user response to the prompt as interaction data 152 in data store 122. Prompt manager 124 (which may be an independent user device application or a component of another user device application) may then transmit the interaction data 152 (e.g., periodically, when connected to network 150, etc.) to interaction component 134 via network 150. In one example, when the user responds to the prompt by agreeing to share the application 112, the prompt manager 124 may detect such a user response and enable the sharing of the application 112 with one or more other users (e.g., by sending a link to download the application 112, a promotional message about the application 112, etc. to the other users via conversation network 140 or network 150). In another example, the prompt manager 124 does not participate in the actual sharing of the application but merely provides the application sharing response of the user to the prompt server 130 (e.g., as part of interaction data 152 or separately).

In yet an alternative implementation, the prompt manager 124 may be a module of an application provided by the application distribution platform to run on the user device 120 (e.g., an application managing an app store or providing an application distribution service on the user device 120). In such an alternative implementation, the prompt manager 124 may include instructions to present the prompt to the user at a predetermined event pertaining to the user interaction with the app store or the application distribution service (e.g., when accessing, viewing or searching the app store, when accessing or otherwise interacting with the application distribution service, etc.). The prompt manager 124 may then receive a user response to the prompt (e.g., dismissal of the prompt, an application rating provided by the user, an application sharing provided by the user, etc.) and store the user response to the prompt as interaction data 152 in data store 122. Prompt manager 124 may then transmit the interaction data 152 (e.g., periodically, when connected to network 150, etc.) to interaction component 134 via network 150. In one example, when the user responds to the prompt by agreeing to share the application 112, the prompt manager 124 may also enable the sharing of the application 112 with one or more other users (e.g., by sending a link to download the application 112, a promotional message about the application 112, etc. to the other users via conversation network 140 or network 150). In another example, the prompt manager 124 may not participate in the actual sharing of the application but rather provide the application sharing response of the user to the prompt server 130 (e.g., as part of interaction data 152 or separately).

In still another implementation, the prompt manager 124 combines an in-app prompt component and an app store prompt component to provide both in-app prompts and app store prompts for applications 112. The in-app prompt component (e.g., a module or a plugin of an operating system of the user device 120) may receive a user response to a prompt displayed via an application or by the in-app prompt component during the operation of the application, store the user response as interaction data 152, and transmit the interaction data 152 to prompt server 130, as discussed in more detail above. The app-store prompt component (e.g., a module of an application managing an app store or providing an application distribution service on the user device 120) may present a prompt to the user accessing/ searching the app store or the application distribution service, receive a user response to the prompt, store the user response as interaction data 152, and transmit the interaction data 152 to prompt server 130, as discussed in more detail above.

Interaction component 134 may receive the interaction data 152 and store the interaction data 152 in the interaction cache 154 of the data store 160. The interaction data 152 may be received from multiple user devices 112 of the user (e.g., a smart phone, a laptop, a PDA, etc.) and associated with the identifier of the user in the data store 160. In one implementation, interaction component 134 may receive an application sharing response of the user from the prompt manager 124 and may enable the sharing of the application 112 with one or more other users (e.g., by sending a link to download the application 112, a promotional message about the application 112, etc. to user devices of the other users via network 150).

The interaction component 134 may access the interaction data 152 to determine whether previous user interactions with applications 112 indicate that the user is interested in providing feedback for the applications 112. For example, the interaction component 134 may analyze the interaction data 152 and determine, based on the interaction data, whether the user's negative responses to previous prompts relating to applications 112 (e.g., dismissal of prompts, negative application ratings, etc.) exceed the user's positive responses to such prompts (e.g., provision of feedback, positive application ratings, applications sharings, etc.) by a predetermined threshold (e.g., a threshold percentage, a threshold number of feedbacks, etc.). If so, the interaction component 134 may determine that the user is not interested in providing feedback for applications 112. Otherwise, the interaction component 134 may determine that the user is interested in providing feedback for applications 112.

PDM component 136 may define conditions for presenting a prompt 114 for feedback for the application 112 to a user as described in more detail herein. For example, the PDM component 136 may define the prompt presentation conditions based on the analysis of the interaction data 152 indicating whether the user is interested in providing feedback for applications 112. PDM component 136 may determine timing, frequency, impact, etc. of displaying the prompt 114 to the user based on the previous user interactions as described in more detail herein. In one implementation in which prompts 114 are presented by prompt manager 124, the PDM component 136 may provide the prompt presentation conditions to the prompt manager 124, and periodically provide updated conditions (determined based on recent interaction data 152) to the prompt manager 124 for presentation to the user (e.g., during operation of the application 112 or in the app store).

In an alternative implementation in which prompts 114 are presented by the application, the PDM component 136 may provide the prompt presentation conditions for inclusion in the application. For example, the application may include instructions on how to present prompt 114 based on the above prompt presentation conditions. In some implementations, the application may periodically request updated prompt presentation conditions from the PDM component 136.

In one implementation, prompt server 130 may host content, such as prompts 114. Prompts 114 may be digital content developed by a content provider (e.g., application developer, app store), digital content uploaded by a content provider (e.g., application developer, app store), digital content provided by the application distribution server 110, etc. Examples of prompts 114 include, and are not limited to, text boxes, links, buttons, a prompt to rate an application, a prompt to share an application, an interruptive dialog for application rating, an interruptive dialog for application sharing, a prompt to make a purchase (e.g., in-app purchase, app store purchase), etc. In one implementation, prompt 114 includes instructions that cause a user device 120 to display, to a user, a prompt to rate or share an application 112.

Prompts 114 may be consumed via a web browser and/or via a mobile device application. For brevity and simplicity, an interruptive dialog is used as an example of a prompt 114 throughout this document. As used herein, "digital content," "content," "content item," "prompt," "dialog," "interruptive dialog," "link," and "button" can include an electronic file that can be executed or loaded using software, firmware or hardware configured to present the prompt 114 to an entity. In one implementation, the prompt server 130 or application distribution platform may store the prompts 114 using the data store 160 (e.g., in prompt cache 123). A prompt 114 may be an interruptive dialog to be presented before, during or after executing an application 112 on a user device 120. Alternatively, a prompt 114 may be an interruptive dialog to be presented before, during or after accessing the application distribution platform (e.g., an app store, application distribution service).

In one implementation, the prompt server 130 may provide prompts 114 to prompt manager 124 of user device 120 to cause prompts 114 to be presented to the user. For example, the same prompts 114 may be provided for all applications 112 or different prompts 114 may be provided for different applications 112, and then presented to the user by prompt manager 124 as discussed above.

Alternatively, the prompt server 130 may allow users (e.g., application developers) to select prompts 114 for their applications (e.g., by presenting available prompts via a user interface for selection). For example, an application developer may select a prompt requesting an application rating and a prompt requesting an application sharing, and add instructions to the application to present these prompts as discussed in more detail above.

Data store 160 may include a prompt cache 123 that stores one or more of instructions that are to be transmitted to cause a user device 120 to display a prompt 114, instructions that have been transmitted to cause a user device 120 to display a prompt 114, prompts 114 that have been displayed, prompts 114 that are to be displayed, etc. Data store 160 may include an interaction cache 154 that stores interaction data 152 (e.g., data regarding previous user interactions of the user with one or more applications 112, rating data, sharing data, engagement data, negative interaction data, feedback interest data, etc.).

User devices 120A-Z may each include computing devices such as personal computers (PCs), laptops, mobile phones, smart phones, tablet computers, netbook computers, network-connected televisions, etc. User devices 120A-Z may be capable of receiving (e.g., downloading) applications 112 from application distribution server 110 over a network 150. User devices 120A-Z may be capable of receiving prompts 114 to display on the user device 120 and/or instructions to display prompts 114 on the user device 120. As discussed above, a prompt 114 may be a prompt for feedback for an application 112. The prompt 114 may be a request to rate or share an application 112. Upon accepting a prompt 114 to share an application 112, the user device 120 may transmit a message sharing the application 112 to one or more other user devices 120 via a conversation network 140, a network 150, or a combination thereof.

Conversation network 140 may be a computing network that provides one or more communication channels between user devices 120A-Z. In one example, conversation network 140 may be a peer-to-peer network that does not rely on a pre-existing network infrastructure (e.g., access points, switches, routers) and the user devices A-Z may replace the networking infrastructure to route communications between the user devices. Conversation network 140 may be a wireless network that is self-configuring and enables user devices 120A-Z to contribute to conversation network 140 and dynamically connect and disconnect from conversation network 140 (e.g., ad hoc wireless network). In another example, conversation network 140 may be a computing network that includes networking infrastructure that enables user devices to communicate with other user devices. In the latter example, conversation network 140 may or may not have access to the public network (e.g., the Internet). For example, a vehicle (e.g., bus, train) or location (e.g., classroom, library, café, etc.) may provide an access point or user device that may function as an access point to enable user devices to communicate with one another without providing internet access. Alternatively, the conversation network 140 may provide access to a larger network such as network 150 (e.g., the Internet). In one implementation, conversation network 140 may be based on any wireless or wired communication technology and may connect a first user device directly or indirectly (e.g., involving an intermediate user device) to a second user device. The wireless communication technology may include Bluetooth®, Wi-Fi®, infrared, ultrasonic or other technology. The wired communication may include universal serial bus (USB), Ethernet, RS 232, or other wired connection. The conversation network 140 may be an individual connection between two devices or may include multiple connections.

Network 150 may be a public network that provides one or more of user devices 120A-Z with access to application distribution server 110, prompt server 130, and other publically available computing devices. Network 150 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

Each of user devices 120A-Z may include an operating system that allows users to execute applications 112. The operating systems may allow users to view messages (e.g., messages sharing an application 112, text messages, chat messages) that are transmitted over conversation network 140 and/or network 150. The application 112 may include a media viewer, a web browser, etc. to present images, videos, audio, web pages, documents, etc. In one example, the application 112 may include a web browser that can access, retrieve, present, and/or navigate content (e.g., web pages such as Hyper Text Markup Language (HTML) pages, digital media items, text conversations, notifications, etc.) served by a web server. The application 112 may render, display, and/or present the content to a user. The application 112 may also display an embedded media player (e.g., a Flash® player or an HTML5 player) that is embedded in a web page (e.g., a web page that may provide information about a product sold by an online merchant). In another example, the application 112 may be a standalone application (e.g., a mobile application or app) that allows users to view digital media items (e.g., digital videos, digital images, electronic books, etc.), to participate in text conversations, and/or to receive prompts 114.

According to aspects of the disclosure, an application 112 may allow users to watch content, participate in a conversation, interact with a prompt 114, share the application 112, rate the application 112, etc. Sharing and/or rating of an application 112 may be via the application and/or the application distribution platform (e.g., application distribution service). An application 112 may be provided to user devices 120A-Z by application distribution server 110 or an application distribution platform. For example, the application 112 may include an embedded media player (as well as other components) included in web pages provided by the application distribution platform. In another example, the application 112 may be provided by the application distribution platform and is installed and executed on user device 120A-Z.

In the example shown in FIG. 1, each user device may include a prompt manager 124 and a data store 122.

Data store 122 may be a memory (e.g., random access memory), a drive (e.g., a hard drive, a flash drive), a database system, or another type of component or device capable of storing data. Data store 122 may include multiple storage components (e.g., multiple drives or multiple databases) that may span multiple computing devices (e.g., multiple server computers). Data store 122 stores interaction data 152 provided by applications 112 or by prompt manager 124.

In one implementation in which prompts 114 are presented by applications 112, the prompt manager 124 periodically sends interaction data 152 provided by the applications 112 to the prompt server 130. In one example, the prompt manager 124 may detect that a recent user response to the prompt involved the sharing of application 112 and may enable the sharing of the application 112 with one or more other users (e.g., by sending a link to download the application 112, a promotional message about the application 112, etc. to the other users via conversation network 140 or network 150). In another example, the prompt manager 124 may not participate in the actual sharing of the application but rather provide the application sharing response of the user to the prompt server 130 (e.g., as part of interaction data 152 or separately).

In another implementation in which prompts 114 are presented by the prompt manager 124, the prompt manager 124 determines whether and/or how to present a prompt 114 to the user based on information regarding the prompt 114, identity of the application 112 associated with the prompt 114, and prompt presentation conditions (e.g., timing, frequency, level of impact for displaying the prompt, etc.) provided by prompt server 130. The prompt manager 124 presents the prompt 114 according to the information received from the prompt server 130, receives the user's response to the prompt 114, stores the user response as interaction data 152 in data store 122.

In one example, the prompt manager 124 may detect that a recent user response to the prompt involved sharing application 112 and may enable the sharing of the application 112 with one or more other users (e.g., by sending a link to download the application 112, a promotional message about the application 112, etc. to the other users via conversation network 140 or network 150). In another example, the prompt manager 124 may not participate in the actual sharing of the application but rather provide the application sharing response of the user to the prompt server 130 (e.g., as part of interaction data 152 or separately).

In one implementation, upon user selecting to share an application 112 (e.g., via positive interaction with a prompt), the user device 120 may transmit a message sharing the application 112 directly to another user device 120 (e.g., via conversation network 140 or network 150). In one implementation, upon user selecting to share an application 112, the prompt server 130 may transmit a message sharing the application 112 to another user device 120 (e.g., via network 150). The message sharing the application 112 may be one or more of a push notification, a mobile native notification, a text message, a desktop notification, an email, an alert, a text conversation, a URL in a conversation, etc. The message sharing the application 112 may indicate that the user of the user device 120 has downloaded the application 112. The message sharing the application 112 may be an invitation to download the application 112. The message may include information included in the application 112 or information about the application 112. The message may include a comment from the user of the user device 120. The user may select one or more of a set of contacts to which a message sharing the application 112 is to be transmitted. In one implementation, the message sharing the application 112 may be transmitted via a conversation (e.g., if the user and the one or more selected set of contacts are in the conversation).

The transmitting of a message to share the application 112 may function in multiple modes including a one-on-one mode, a public mode, and a private mode. The one-on-one mode may involve the user device 120A transmitting messages to a user of user device 120B and receiving messages from the user of user device 120B.

The public mode may be similar to the one-on-one mode in that user device 120 may receive messages from a user, but when the public mode is enabled there may be multiple user devices. Some or all of a selected set of contacts of the user may be associated with an application distribution server 110 (e.g., from which the application 112 may be downloaded). User device 120 may select one or more of the users without selecting a specific user device. In this example, the user device that is sharing the application 112 may remain anonymous to user device 120. In public mode, the sharing of an application 112 may be a public message so that users who are not contacts of the user may see what messages are being transmitted or users who are not contacts of the user may receive the messages.

The private mode may be similar to the one-on-one mode and the public mode but may include an approval stage. During the approval stage, the user device that is participating in an application distribution platform may receive a request to receive a message sharing an application 112 from another user and may approve or disapprove receiving the message. In one example, the approval or disapproval may be based on user input, in which case the interaction component 134 and may notify the user and the user may provide input that approves or disapproves the receiving of the message sharing application 112. In private mode, the message sharing the application 112 may be a private conversation so that only the participants in the conversation see the message.

In general, functions described in one implementation as being performed by the application distribution server 110 and/or prompt server 130 can also be performed on the user devices 120A through 120Z in other implementations, if appropriate. For example, prompt manager 124 may use interaction data 152 stored locally in data store 122 to determine (instead of prompt server 130) whether the user's previous interactions with applications 112 indicate that the user is interested in providing feedback for applications 112 and then decide whether to present a prompt 114 based on the above determination.

In general, functions described in one implementation as being performed on the user devices 120A through 120Z can also be performed by the application distribution server 110 and/or prompt server 130 in other implementations, if appropriate. For example, the application distribution platform may collect and store user ratings received via the application distribution server platform as interaction data 152, transmit the interaction data 152 to prompt server 130, and receive prompt presentation conditions from the prompt server 130 to display a prompt to a user via the application distribution platform. In another example, a set of applications may collect and store user ratings received via an application of the set of applications as interaction data 152, transmit the interaction data 152 to prompt server 130, and receive prompt presentation conditions from the prompt server 130 to display a prompt to a user via another application of the set of applications.

In addition, the functions of a particular component can be performed by different or multiple components operating together. The application distribution platform, application distribution server 110, and prompt server 130 can also be accessed as a service provided to other systems or devices through appropriate application programming interfaces (API), and thus is not limited to use in websites and applications.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline of the application distribution platform.

Although implementations of the disclosure are discussed in terms of an application distribution server 110, prompt server 130, and an application distribution platform, implementations may also be generally applied to any type of social network providing content and connections between users.

In situations in which the systems discussed here collect personal information about users, or may make use of personal information, the users may be provided with an opportunity to control whether the application distribution platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the application distribution platform and what user information is transmitted to the application distribution server 110 and prompt server 130. In another example, in response to interacting with a prompt 114 to share an application 112, a message sharing the application 112 may only be transmitted to participants in the same conversation as the user. In another example, the user may select to which users the user wants to send messages sharing the application 112 and messages sharing the application 112 will only be sent to those users. Thus, the user may have control over with whom message sharing the application 112 are shared.

Figure 2:
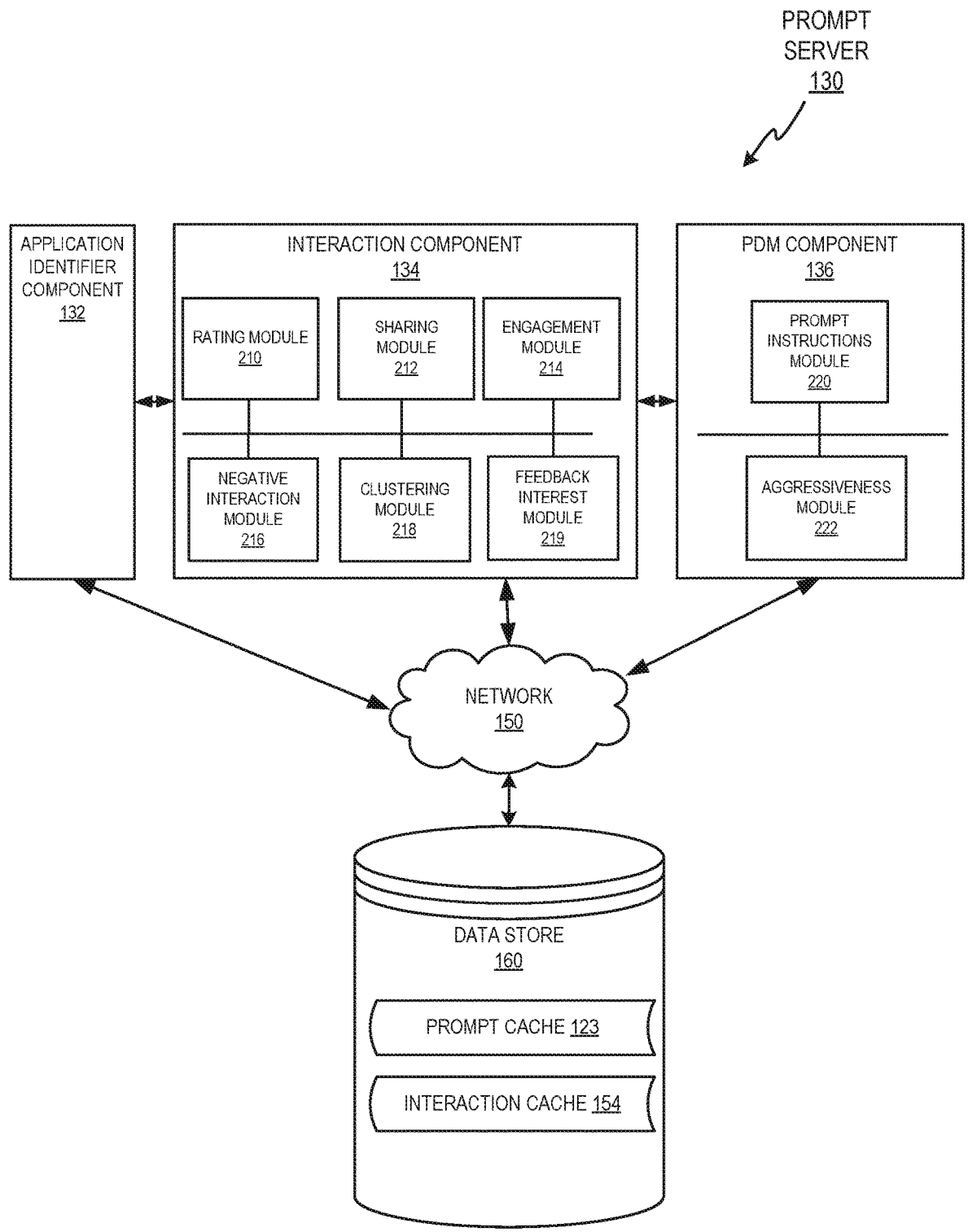
FIG. 2 is a block diagram illustrating the components and modules of a prompt server, in accordance with an implementation of the disclosure.

FIG. 2 is a block diagram illustrating the prompt server 130. In the example shown in FIG. 2, the prompt server 130 includes an application identifier component 132, an interaction component 134, and a PDM component 136 coupled to data store 160 via network 150. One or more of the application identifier component 132, interaction component 134, or PDM component 136 may be part of prompt server 130, application distribution server 110, or application distribution platform.

Application identifier component 132 identifies an application 112 for which feedback is desired. In one implementation, application identifier component 132 receives instructions (e.g., from a third party, an application developer, an application owner, etc.) identifying an application 112 for which feedback is desired. In one implementation, application identifier component 132 monitors one or more applications 112 (e.g., a family of applications, applications in an app store, etc.) to identify an application 112 for which feedback is desired (e.g., the application 112 has a low amount of ratings or shares). In one implementation, the application identifier component 132 identifies applications 112 that are new or have a new version (e.g., do not have many ratings or shares).

Interaction component 134 determines whether previous user interactions with applications 112 indicate that the user is interested in providing feedback for the applications 112. Interaction component 134 may include a rating module 210, a sharing module 212, an engagement module 214, a negative interaction module 216, a clustering module 218, and a feedback interest module 219.

The interaction component 134 may determine interactions of the user with prompts and applications displayed by one or more user devices of the user. The interaction component 134 determines interactions of the user by collecting and storing feedback provided by the user for applications 112 (interaction data 152) in interaction cache 154 of data store 160. Interaction component 134 may collect interaction data 152 from one or more user devices 120 of the user. The interaction data may include rating data, sharing data, engagement data, negative interaction data, clustering data, and feedback interest data.

Rating data includes previous user interactions of a user with a prompt 114 to rate an application 112. The rating module 210 may determine the previous user interactions (e.g., rating data) of a user of user device 120 with a prompt 114 to rate an application 112. The rating module 210 may collect and store ratings of applications 112 (ratings data) provided by the user. The prompt manager 124 may receive user responses to prompts for rating an application (user ratings), store the user responses as rating data, and transmit the rating data to the rating module 210. The rating module 210 may collect (e.g., receive) rating data from one or more user devices 120 of the user and store the rating data as interaction data 152 in the interaction cache 154. The user ratings may be via interactions of the user while accessing/searching an application distribution platform (e.g., an app store) and/or during operation of an application of a family of applications.

The previous user interaction (e.g., rating data) of the user may include dismissing the prompt 114, providing a rating through the prompt 114, the level of the rating provided through the prompt 114 (e.g., how many of a total number of stars, recommends, does not recommend, etc.), leaving a comment through the prompt 114, etc. Positive interaction of the user with the prompt 114 may include providing a rating through the prompt 114, providing a rating that meets a threshold rating level through the prompt 114 (e.g., at least three out of five stars), or providing a rating that does not meet a threshold rating level with an accompanying comment (e.g., providing one or two stars out of five stars without a comment of why the low rating was provided). The rating module 210 may store interaction data 152 (e.g., rating data, etc.) in the interaction cache 154 of data store 160.

Sharing data includes previous user interactions of a user with a prompt 114 to share an application 112. The sharing module 212 may collect and store application sharing responses (sharing data) provided by the user to prompts for sharing an application. The prompt manager 124 may receive user responses to prompts for sharing an application (application sharing responses), store the user responses as sharing data, and transmit the sharing data to the sharing module 212. The sharing module 212 may collect (e.g., receive) the sharing data from one or more user devices 120 of the user and store the sharing data as interaction data 152 in the interaction cache 154. The application sharing responses may be via interactions of the user while accessing/searching an application distribution platform (e.g., an app store) and/or during operation of an application of a family of applications. The sharing data may include which application was shared, the information included (e.g., comment, link, etc.) in the message sharing the application, the users with which the application was shared, etc. Positive interaction of the user with the prompt 114 includes sharing the application with one or more users.

The engagement module 214 may determine a level of engagement (e.g., engagement data, previous user interactions) of the user with applications 112. The previous user interactions may include a level of engagement of the user with an application 112 (e.g., the application 112 for which prompt server 130 is determining whether to present a prompt 114).

Engagement may include engagement of the user with features of an application 112. Engagement may include an indication of positive preference of (e.g., "liking") content (e.g., multimedia content) through the application 112. Engagement may include consuming (e.g., watching, purchasing) content through the application 112. Engagement may include the quantity of time that the user interacts with the application 112. Engagement may include the number of interactions with the application 112 (e.g., number of launches, number of new activities, number of refreshing of content, etc.). Engagement may include achievement reached (e.g., level of a game, pages read, modules completed, etc.) through the application 112. Engagement may include the applications 112 with which the user has interacted (e.g., number of applications 112 in a family of applications with which a user has interacted, etc.). In one implementation, engagement includes purchases made (e.g., in-app purchases, app store purchases, etc.).

A level of engagement may refer, for example, to a number of interactions with applications 112 of the application distribution server 110 over a time period. A level of engagement may refer, for example, to a number of interactions with applications 112 of a certain family of applications or a particular application over a time period. The engagement module 214 may store interaction data 152 (e.g., engagement data, etc.) in the interaction cache 154 of data store 160. In one implementation, the engagement data may be specific to engagement of the user with an application 112 for which the PDM component 136 is determining whether to provide a prompt 114 to the user. In one implementation, the engagement data may encompass engagement of the user with one or more applications 112. The one or more applications 112 may or may not include the application 112 for which the PDM component 136 is determining whether to provide the prompt 114 to the user.

The negative interaction module 216 may determine negative interaction behavior (e.g., negative interaction data, previous user interactions) of the user with applications 112 or prompts 114. Negative interaction behavior may include dismissing a prompt 114. Negative interaction behavior may include leaving a poor rating through a prompt 114 (e.g., one out of four stars, etc.). Negative interaction data may include leaving a poor rating without a comment through a prompt 114 (e.g., indicating the user may be annoyed by the prompt 114, but not with the application 112). Negative interaction data may include low engagement with the application 112 (e.g., the user has less than a threshold amount of engagement with an application within a threshold amount of time, the rating may not be an honest rating of the application 112). The negative interaction module 216 may flag a user as having negatively responded to a threshold amount of prompts 114 over a threshold amount of time. The user may then be flagged across all services of an application distribution platform (e.g., the user may not receive additional prompts 114 for any applications 112 associated with the application distribution platform). The negative interaction module 216 may store interaction data 152 (e.g., negative interaction data, whether the user is flagged, how many times the user was flagged over a period of time, etc.) in the interaction cache 154 of data store 122.

The clustering module 218 may group users into clusters based on user information. For example, a first cluster may include users within a first age group and a second cluster may include users within a second age group. In another example, a first cluster includes users located in a first geographical location and the second cluster includes users in a second geographical location.

The clustering module 218 may generate a median positive interaction rate for each cluster based on the interaction data 152 of at least a subset of the users within the cluster. For example, if there are ten people in a cluster and rating data is known for five people, the clustering module 218 may use the known rating data to generate a median positive interaction rate (e.g., a median of the different rating data values) for the cluster. If interaction data 152 of a first user is not known and interaction data 152 of other users in the same cluster as the first user is known, the clustering module 218 can calculate a median positive interaction rate for the cluster. The median positive interaction rate can be used to determine whether to show a prompt to any user in the corresponding cluster.

In one implementation, the clustering module 218 receives user information corresponding to users from the user devices 120. In one implementation, the clustering module 218 receives the user information (e.g., profile information, registration information, application download information, etc.) from the application distribution server 110 or the application distribution platform. The user information may include user attributes (e.g., age group), how long the user has been using the service (e.g., an application 112, application distribution platform, etc.), the device type of the device 120, user behavior history, geolocation, type of applications 112 installed on the user device 120, etc. The clustering module 218 may store interaction data 152 (e.g., interaction data of each of the clusters, user information, cluster data, median positive interaction rates of each cluster, users in each cluster, etc.) in the interaction cache 154 of data store 122.

The feedback interest module 219 may access the interaction data 152 from the interaction cache 154. The feedback interest module 219 may determine from the interaction data 152 whether the previous user interactions with applications 112 indicate the user is interested in providing feedback for the applications 112.

In one implementation, the feedback interest module 219 may determine the user is interested in providing feedback in response to determining the interaction data 152 indicates that a quantity of the one or more ratings (e.g., rating data) meets a threshold quantity (e.g., the user has rated a threshold number of applications). In one implementation, the feedback interest module 219 may determine the user is interested in providing feedback in response to determining that the interaction data 152 indicates that a quantity of the one or more shares meets a threshold quantity (e.g., the user has shared a threshold number of applications, the user has caused a threshold number of messages sharing one or more applications to be sent). In one implementation, the feedback interest module 219 may determine the user is interested in providing feedback in response to determining that the level of engagement meets a threshold level.

In one implementation, the feedback interest module 219 may determine the user is interested in providing feedback in response to determining that a quantity of negative interactions does not meet a threshold quantity. In one implementation, the feedback interest module 219 may determine the user is interested in providing feedback in response to determining that a number of flags indicating negative interaction are below a threshold number.

In one implementation, the feedback interest module 219 may determine the user is interested in providing feedback in response to determining that a median positive interaction rate (e.g., corresponding to the cluster associated with the user) meets a threshold rate.

In one implementation, the feedback interest module 219 may determine the user is interested in providing feedback in response to determining a combination of two or more of rating data, sharing data, engagement data, negative interaction data, or median positive interaction rate from the interaction data 152 meet a threshold.

The interaction data 152 may include feedback interest data (e.g., a determination if the user is interested in providing feedback for applications 112) generated by the feedback interest module 219. The feedback interest module 219 may store interaction data 152 (e.g., feedback interest data) in the interaction cache 154 of the data store 160.

PDM component 136 may include a prompt instruction module 220 and an impact module 222. The PDM component 136 may access the interaction data 152 in the interaction cache 154.

The prompt instruction module 220 may define conditions for presenting a prompt 114 for the feedback for the application 112. For example, the prompt instruction module 220 may define the prompt presentation conditions based on the analysis of the interaction data 152 (e.g., the feedback interest data) indicating whether the user is interested in providing feedback for applications 112. The prompt presentation conditions may include the timing, frequency, impact, etc. of displaying the prompt 114 to the user based on the interaction data 152 and the impact level determined by the impact module 222.

In one implementation, the prompt instruction module 220 may provide prompt presentation conditions to the prompt manager 124 to display the prompt 114 to make a purchase (e.g., an in-app purchase, an app store purchase) if the interaction data 152 indicates the user previously made purchases (e.g., in-app purchases, app store purchases). The interaction data 152 may indicate the cluster of users that includes the user is interested in or made purchases via applications 122 or in the application distribution platform (e.g., an in-app purchase, an app store purchase).

In one implementation, the impact module 222 may determine a level of impact (or "aggressiveness") for displaying the prompt 114 to the user based on the previous user interactions (e.g., interaction data 152). The level of impact may include invasiveness of the prompt 114 (e.g., the prompt 114 requires interaction to continue interacting with the application 112, the level of interaction (e.g., swiping the prompt 114, inserting input in the prompt 114) to dismiss the prompt 114, the user can scroll past the prompt 114, the prompt 114 does not limit functionality of the application 112, etc.). The level of impact may include size of the prompt 114 (e.g., the amount of the application 112 that the prompt 114 blocks, the amount of the user interface that the prompt 114 covers (e.g., a full page interstitial), etc.). The level of impact may include frequency of displaying the prompt. The level of impact may include timing of the displaying of the prompt 114 (e.g., the prompt 114 is displayed after the playing of a media content item, the prompt 114 is displayed after completing a level or module, the prompt 114 is displayed while the application 112 is loading). The level of impact may include location of displaying the prompt 114 (e.g., the prompt 114 is shown at the bottom of the user interface, amount of functionality of the user interface that the prompt 114 covers). As described in this disclosure, the user device 120 displaying the prompt 114 to the user may include displaying the prompt 114 based on the level of impact (e.g., at the level of impact determined by the impact module 222). The level of impact of displaying the prompt 114 may increase as the interest of the user in providing feedback for the applications increases (e.g., as indicated by the previous user interactions with the one or more applications). Different levels of interest or previous user interactions may be related to different levels of impact.

Figure 3:
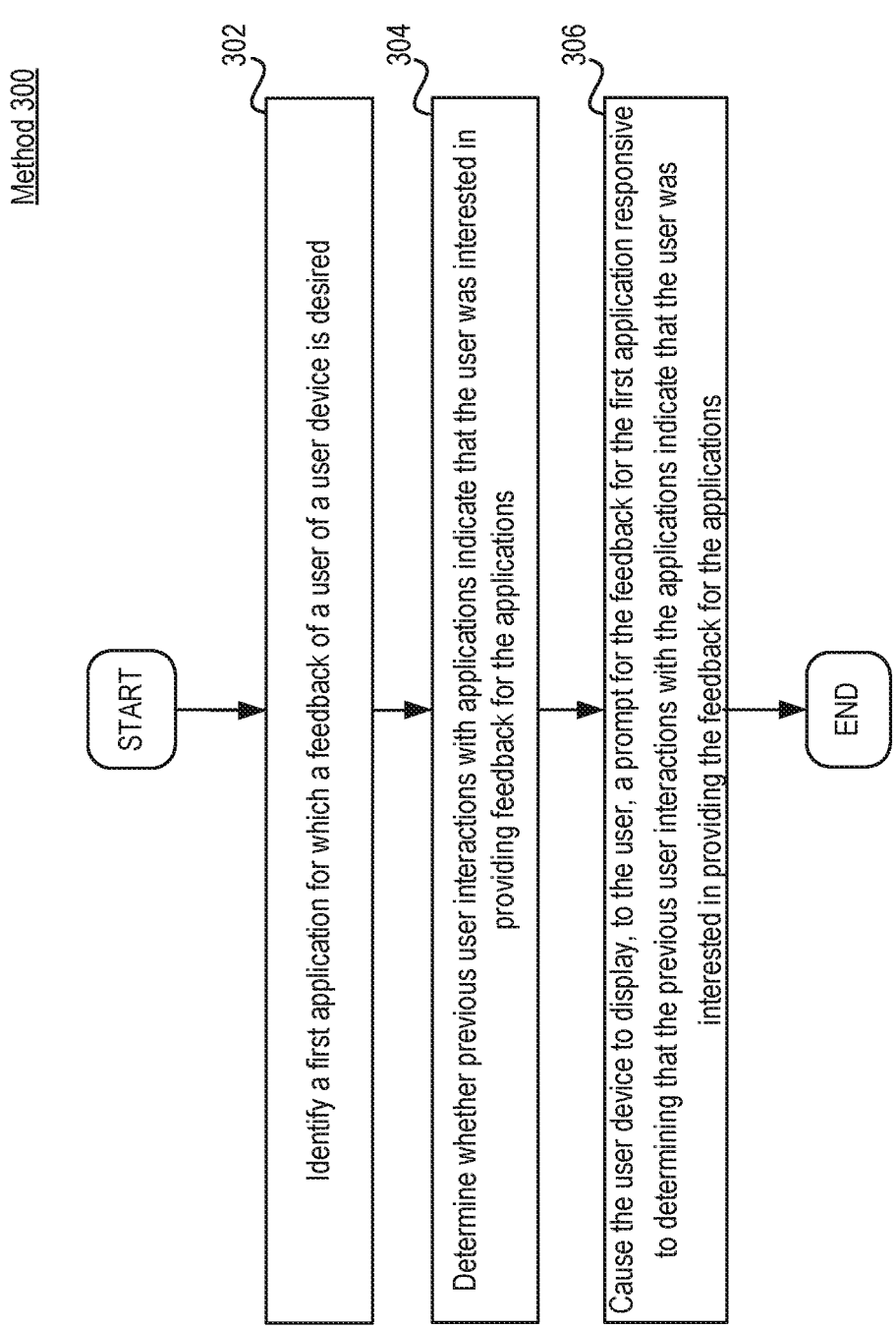
FIG. 3 is a flow diagram illustrating an example method of causing a prompt to be displayed to a user based on previous user interactions, in accordance with an implementation of the disclosure.
Figure 4:
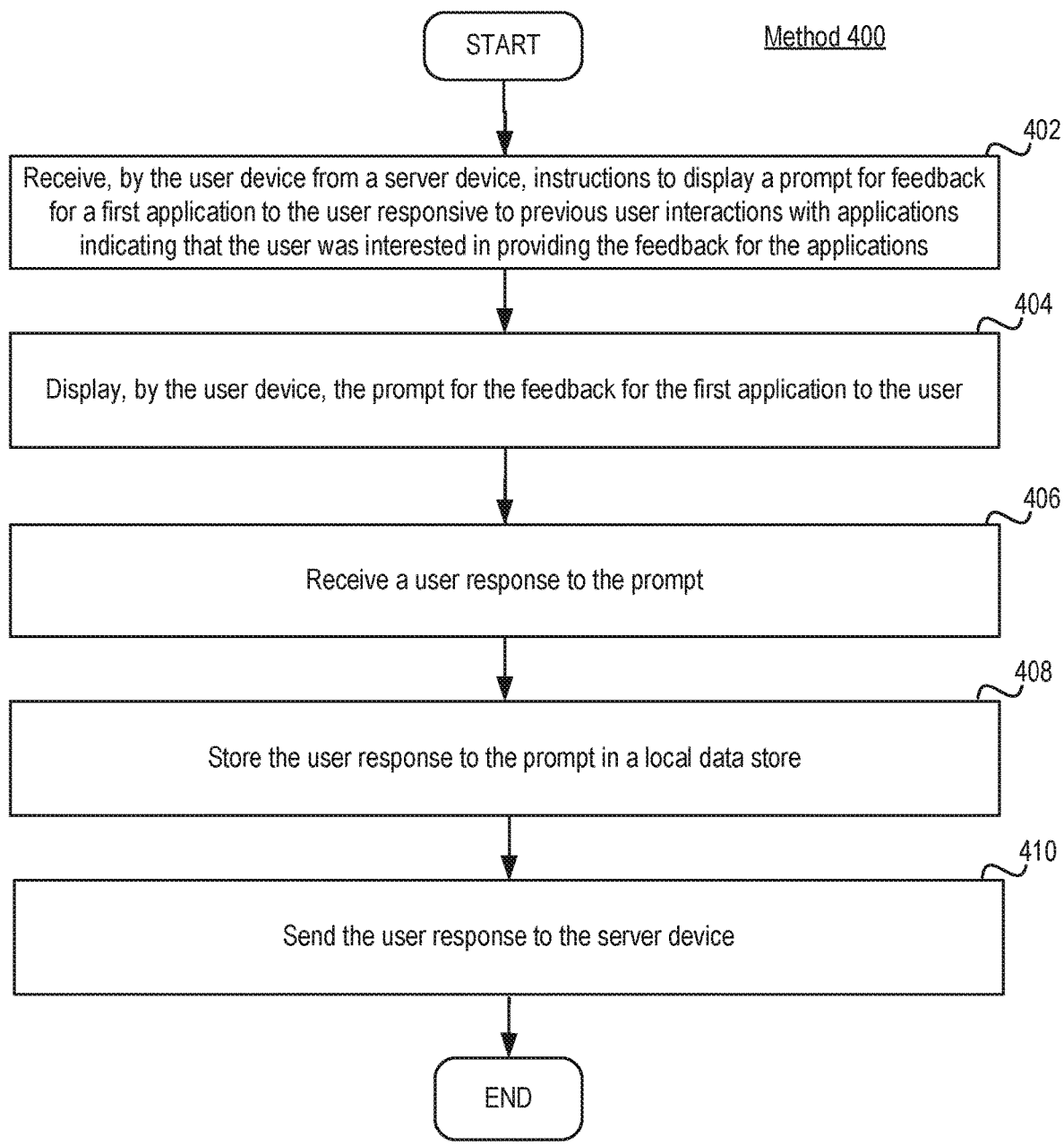
FIG. 4 is a flow diagram illustrating an example method of displaying a prompt to a user based on previous user interactions, in accordance with an implementation of the disclosure.

FIGS. 3-4 depict flow diagrams for illustrative examples of methods 300 and 400 for implementing personalized interruptive dialogs for application rating and sharing. Method 300 is an example method from the perspective of a server device (e.g., prompt server 130). Method 400 is an example method from the perspective of a user device (e.g., user device 120). Methods 300 and 400 may be performed by processing devices that may include hardware (e.g., circuitry, dedicated logic), software (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. For example, a non-transitory machine-readable storage medium may store instructions which, when executed, cause a processing device (e.g., of a user device 120, of prompt server 130, etc.) to perform operations including methods disclosed within. In one implementation, method 300 may be performed by prompt server 130 of FIG. 1 and method 400 may be performed by user device 120 of FIG. 1.

Referring to FIG. 3, method 300 may be performed by one or more processing devices of a prompt server 130 that cause the user device 120 to display a prompt 114 to a user.

Method 300 may begin at block 302 where the processing device of a server device (e.g., prompt server 130, PDM component 136) may identify a first application 112 for which feedback of a user of a user device (e.g., user device 120) is desired. In one example, the processing device may determine that an application 112 has a quantity of ratings or shares that are below a threshold level. In another example, the processing device may determine the application 112 is new or has a new version that has not been rated or shared. In another example, the processing device may receive input indicating an application 112 (e.g., from a third party, from an application vendor, etc.) for which feedback is desired.

At block 304, the processing device may determine whether previous user interactions (e.g., interaction data 152, ratings, shares, engagement, low negative interaction, etc.) with applications indicate that the user is interested in providing feedback for the applications.

In one implementation, the previous user interactions include ratings of applications by the user via prompts. The processing device may determine that a quantity of ratings of applications performed by the user meets a threshold quantity, which indicates that the user is interested in providing new feedback for the applications. For example, a family of applications may include five applications and a threshold amount of ratings may be two. If a user has rated at least two of the five applications, the processing device may determine the previous interactions (e.g., two ratings) indicate the user is interested in providing the feedback.

In one implementation, the previous user interactions include a level of engagement of the user with the first application. The processing device may determine that the level of engagement meets a threshold level, which indicates that the user is interested in providing new feedback for the applications. The level of engagement may be determined by one or more of the amount of time the user has been using the application, the user's purchases through the application, the user's level achieved on the application, etc. For example, the threshold level may be five hours of use of the application. If the user has interacted with the application for at least five hours, the processing device may determine the previous interactions (e.g., five hours of interaction) indicate the user is interested in providing the feedback.

In one implementation, the previous user interactions include ratings, by the user via one or more prompts, of applications and a level of engagement of the user with the first application 112. The processing device may generate a combined score based on the one or more ratings and the level of engagement, and determine the combined score meets a threshold score, which indicates that the user is interested in providing new feedback for the applications. For example, each rating may be ten points, each hour of interaction may be ten points, the generated score may be the sum of the points from ratings and hours of interaction, and the threshold score may be fifty points.

In one implementation, the previous user interactions include negative interactions. Negative interactions may include, for example, dismissing a prompt to rate applications, having a level of engagement with the application that does not meet a threshold level, providing a rating for one or more applications that does not meet a threshold rating and/or does not have an accompanying comment, etc. The processing device may determine that a quantity of negative interactions does not meet a threshold quantity, which indicates that the user is interested in providing new feedback for the applications. For example, if the threshold amount of negative interactions is three, and the user provided two negative interactions, then the processing device may determine the previous interactions (e.g., two negative interactions) indicate the user is interested in providing the feedback.

At block 306, responsive to determining that the previous user interactions with the application(s) indicate that the user is interested in providing feedback for the application(s), the processing device may provide instructions (e.g., including prompt presentation conditions) to the user device to cause the user device (e.g., user device 120) to display, to the user, a prompt 114 for the feedback for the application 112. In one implementation, the processing device provides the instructions to the application 112. In another implementation, the processing device provides the instructions to prompt manager 124.

In one implementation, the prompt 114 for the feedback for the application 112 is a request to rate the application 112. In one implementation, the prompt 114 for the feedback for the application 112 is a request to share the application 112. In one implementation, the prompt 114 is a request to make a purchase (e.g., in-app purchase, app store purchase).

In one implementation, method 300 further includes determining a level of impact for displaying the prompt to the user based on the previous user interactions (e.g., interaction data 152). The level of impact may include at least one of invasiveness of the prompt, size of the prompt, or location of the displaying of the prompt. For example, in response to determining the user has high interest in providing feedback for the application, the processing device may transmit instructions to the prompt manager 124 to cause the prompt 114 to be displayed to encompass the entire user interface of the user device. In another example, in response to determining the user has lower interest in providing feedback for the application, the processing device may cause the prompt 114 to be displayed to encompass a small portion of the user interface of the user device. In one implementation, the processing device may alternatively or in addition utilize prompt presentation conditions (e.g., frequency of the displaying of the prompt, timing of the displaying of the prompt, etc.) defined above to determine when and how to display the prompt. For example, if the user has high interest in providing feedback for the application, the prompt presentation conditions can specify that the prompt 114 be displayed upon launching the application. In another example, if the user has lower interest in providing feedback for the application, the prompt presentation conditions can specify that the prompt 114 be displayed while loading the next level of the application after successfully completing one or more earlier levels of the applications.

In one implementation, method 300 further includes receiving user information corresponding to various users. The method 300 may group the users into clusters based on the user information. A median positive interaction rate may be determined for each cluster based on the interaction data 152 of users in the cluster. For example, available rating data, sharing data, and engagement data for users in a first cluster may be combined to generate a first median positive interaction rate for the first cluster. The processing device may determine that the user is part of a first cluster of users and determine that the first median positive interaction rate of the first cluster meets a threshold rate. The processing device may provide (e.g., to the prompt manager 124 of the user device 120) prompt presentation conditions based on the analysis of the first median positive interaction rate of the first cluster indicating that the user is interested in providing feedback for applications. The user device may display the prompt 114 to the user (e.g., based on the interaction data 152 of other users in the cluster).

Referring to FIG. 4, method 400 may be performed by one or more processing devices of a user device and may begin at block 402.

At block 402, the processing device of the user device of a user may receive (e.g., over network 150 from prompt server 130) instructions (e.g., including prompt presentation conditions) to display a prompt 114 for feedback for a first application 112 to the user. As discussed above, the prompt presentation conditions may be based on the analysis of the interaction data 152 indicating (e.g., as determined by prompt server 130) that the user is interested in providing the feedback for the application. In one implementation, the interaction data 152 pertains to applications including the first application 112. In another implementation, interaction data 152 pertains to applications other than the first application 112.

The prompt presentation conditions may include a level of impact (e.g., size, frequency, ease of dismissing, timing, location) of displaying the prompt 114 based on the analysis of the interaction data 152 indicating the user's interest in providing feedback.

At block 404, the processing device displays the prompt 114 for feedback for the first application 112 to the user (e.g., based on the prompt presentation conditions). For example, the prompt presentation conditions may be provided to the first application 112, which then presents the prompt according to the prompt presentation conditions. In another implementation, the prompt presentation conditions may be provided to the prompt manager 124, which then presents the prompt according to the prompt presentation conditions.

The prompt presentation conditions may cause the prompt 114 to be displayed based on a determined level of impact. For example, as the number of ratings by the user, the number of shares by the user, the level of engagement of the user (e.g., hours using application, level on application, purchases on application, etc.) increase, the invasiveness (e.g., difficulty of dismissing), frequency of displaying, size, etc. of the prompt may also increase. The prompt 114 is discussed in more detail in regards to FIG. 5.

At block 406, the processing device receives a user response to the prompt. The user response may be, for example, a dismissal of the prompt, a ranking of the first application 112, a sharing of the first application 112, a comment pertaining to the first application 112, etc.

At block 408, the processing device stores the user response to the prompt in a local data store.

At block 410, the processing device sends the user response (as part of interaction data) to the server (e.g., prompt server 130).

Figure 5:
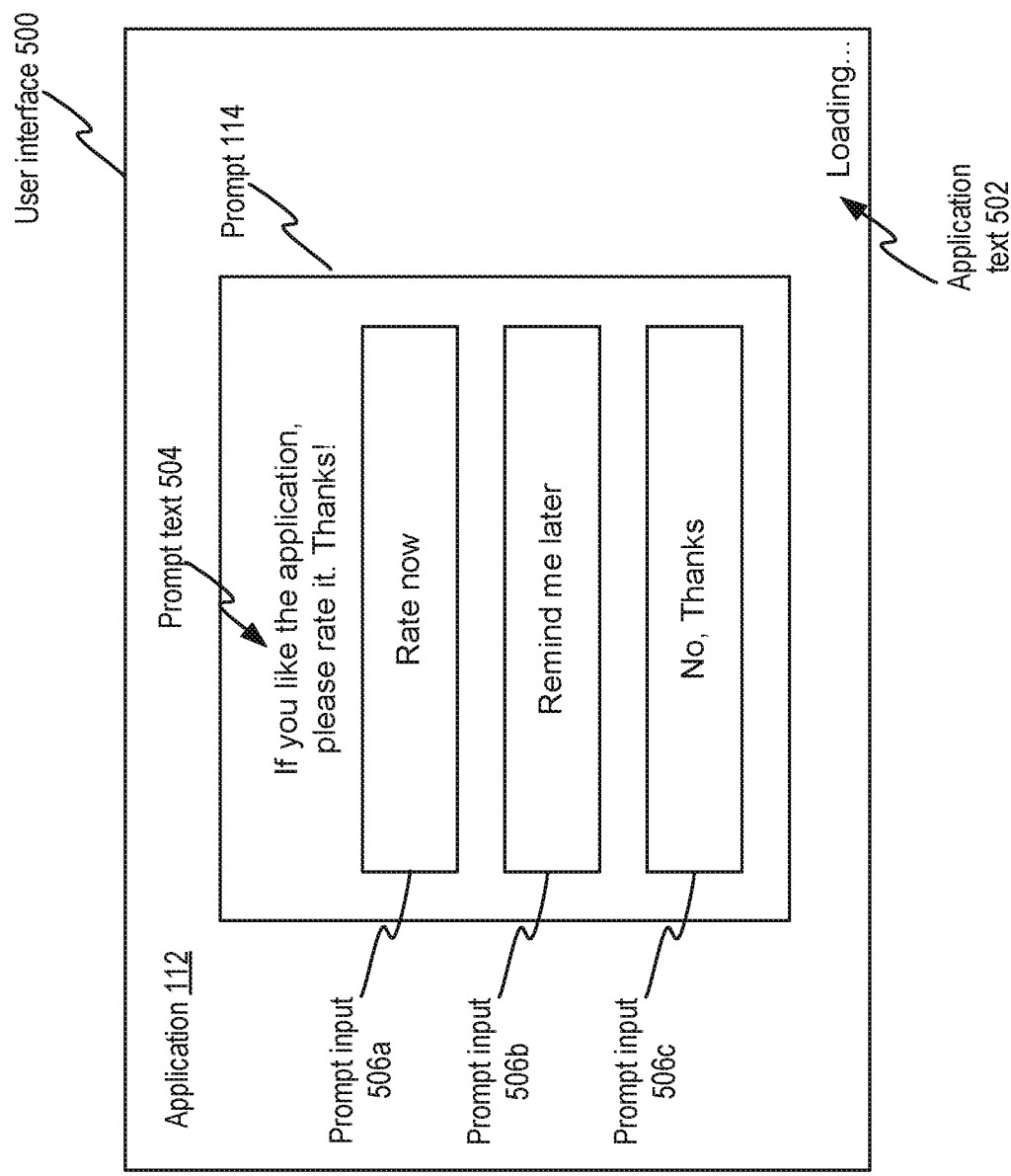
FIG. 5 is an example graphical interface displaying a prompt, in accordance with an implementation of the disclosure.

FIG. 5 is an example graphical interface 500 for a user device (e.g., user device 120) that is displaying a prompt 114 (e.g., an interruptive dialog), in accordance with an implementation of the disclosure.

Referring to FIG. 5, a user device may display a user interface 500. The prompt server 130 may identify an application 112 (e.g., the application 112 shown in FIG. 5) for which feedback of a user of a user device is desired. The user device of a user may have downloaded the application 112 from the application distribution server 110. The prompt server 130 may determine that the previous user interactions with applications (e.g., quantity of time using the application 112, quantity of ratings or shares of applications, etc.) indicate that the user is interested in providing the feedback for the applications. The prompt server 130 may transmit instructions (e.g., prompt presentation conditions) to the user device to cause the user device to display the prompt 114 for feedback for the application 112. In one implementation, the prompt presentation conditions may cause the user device to display the prompt 114 during the operation of an application. In another implementation, the prompt presentation conditions may cause the user device to display the prompt 114 while the user is accessing/searching an app store.

In one implementation, the prompt presentation conditions may include a level of impact (e.g., when, how, how often, etc.) to be used to display the prompt 114. For example, the determined level of impact may define the size of the prompt 114, a portion of the application 112 that can be covered by the prompt 114, the ease of dismissing the prompt 114, the frequency that the prompt 114 is displayed, when the prompt 114 is displayed, etc. The previous user interactions of the user may indicate a level of interest in providing feedback for applications. If the level of interest is below a first threshold level, the prompt server 130 may not instruct the user device to display the prompt 114. If the level of interest meets the first threshold level, the prompt server 130 may provide prompt presentation conditions to cause the user device to display the prompt in a non-aggressive manner (e.g., low frequency, while the application is loading, after completing a level in the application, a small prompt, a prompt that does not block the operation of the application, etc.). If the level of interest meets a second threshold level that is higher than the first threshold level, the prompt server may provide prompt presentation conditions to cause the user to display the prompt in an aggressive manner (e.g., frequently, a larger size of the prompt, during user interaction with other applications, blocking the operation of applications, etc.).

In one implementation, the user interface 500 displays a prompt 114 for rating an application 112. In another implementation, the prompt 114 is for sharing the application 112. The application 112 may be shown behind the prompt 114. The application 112 may be obscured (e.g., shaded). The application 112 may show application text 502. The application text 502 may indicate a process that the application 112 is currently undertaking (e.g., "Loading . . . "). The prompt 114 may include prompt text 504 (e.g., "If you like the application, please rate it. Thanks!"). The prompt text 504 may invite the user to rate the application 112. The prompt 114 may have one or more options of prompt input 506. In one implementation, a prompt input 506a may request a rating (e.g., "Rate now"). In one implementation, a prompt input 506b may provide the option to provide a rating at a later point in time (e.g., "Remind me later"). In one implementation, a prompt input 506c may provide the option of dismissing the prompt 114 (e.g., "No, thanks," a close button, etc.).

In one implementation, upon selecting prompt input 506a, the user may be directed to rate the application 112 in conjunction with the application 112 (e.g., in-app rating). In one implementation, upon selecting prompt input 506a, the user may be directed to the application distribution platform to rate the application 112 within the application distribution platform (e.g., in app store rating). Whether previous user interactions with one or more second applications indicate that the user is interested in providing feedback for the one or more second applications (e.g., as determined by the prompt server 130) may determine whether the user is directed to rate the application 112 in conjunction with the application 112 (e.g., in-app rating) or within the application distribution platform (e.g., rating within the app store).

The interaction data 152 may rate interaction behavior of a user higher in response to the user being directed to the application distribution platform from an application 112 (e.g., the user providing an in-app rating before rating the application 112 in the app store) than if the user was not directed to the application distribution platform from an application (e.g., the user rating the application 112 in the app store without providing an in-app rating first). Application-referred ratings may be a better indication of whether previous user interactions with one or more second applications indicate that the user is interested in providing feedback for the one or more second applications (e.g., a better representation of the probability of positive interaction of the user with a prompt 114 displayed in conjunction with an application 112, a user providing an app store rating after providing a corresponding in-app rating may be a better indicator of whether the user is likely to provide an in-app rating for another application).

In one implementation, the interaction data 152 may rate interaction behavior of a user higher in response to the user downloading an application 112 after the application 112 was shared with the user (e.g., a contact of the user sent a message sharing application 112 to the user). If the contact of the user had positive enough of a preference for the application 112 to share the application 112 with the user, the user may be more likely to rate the application 112 higher (e.g., the contact of the user and the user may have similar preferences, the user may have a high preference for the application 112 since the contact of the user has a high preference for the application 112, etc.).

Figure 6:
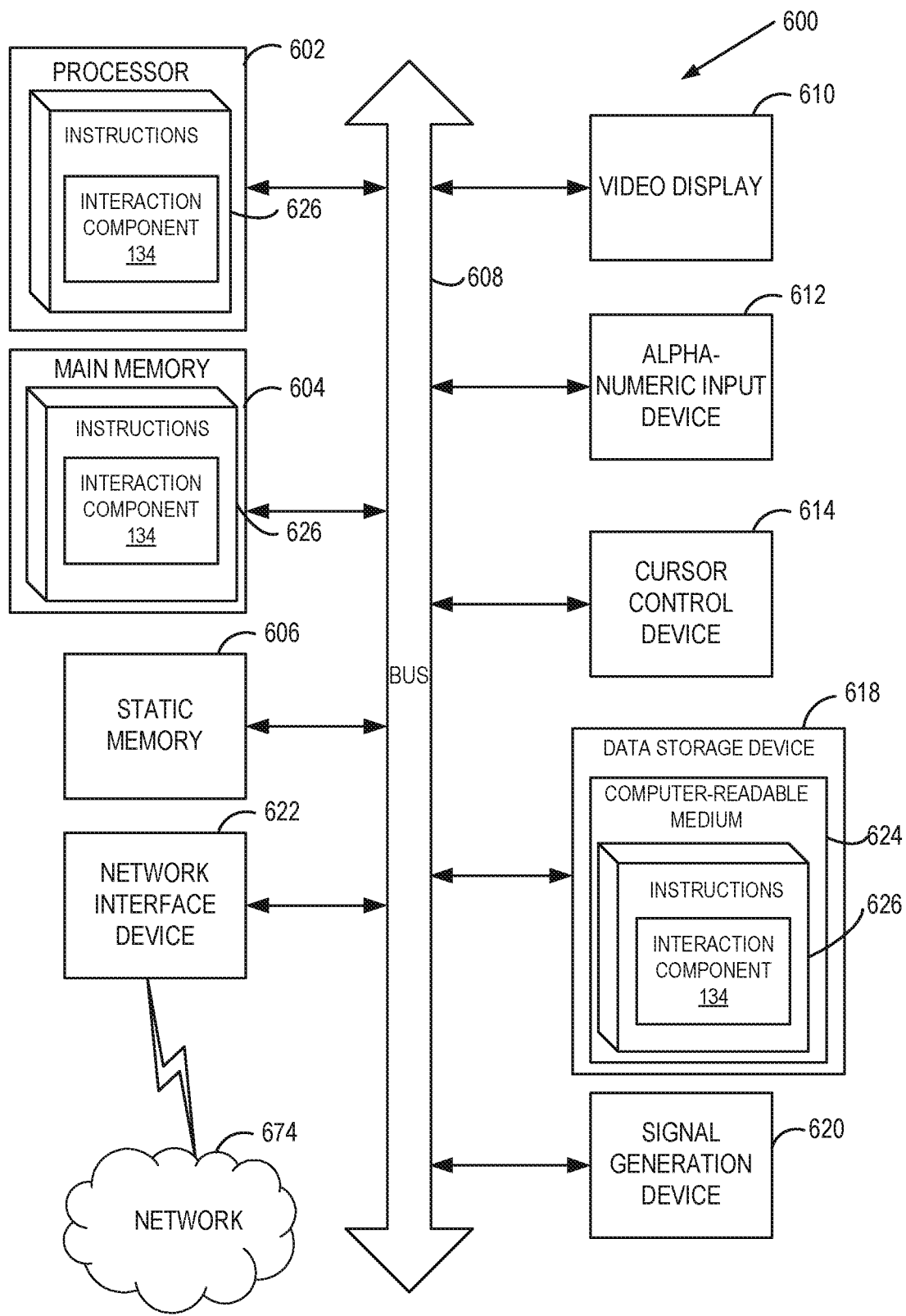
FIG. 6 is a block diagram illustrating one implementation of a computer system, in accordance with an implementation of the disclosure.

FIG. 6 is a block diagram illustrating one implementation of a computer system, in accordance with an implementation of the disclosure. In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding interaction component 134 of FIG. 2 and for implementing methods 300 or 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "determining," "receiving," "causing," "clustering," "transmitting," "displaying" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying a first application for which a feedback of a user of a user device is desired;
   identifying, by a processing device, previous user interactions with one or more second applications, wherein the one or more second applications are different from the first application, and wherein the previous user interactions comprise one or more negative interactions comprising at least one of: dismissing a corresponding prompt to rate the one or more second applications; or a rating for the one or more second applications that does not meet a threshold rating and that does not have an accompanying comment; and
   responsive to a quantity of negative interactions satisfying a threshold condition, causing the user device to display, to the user, a prompt for the feedback for the first application.

2. The method of claim 1, wherein the prompt for the feedback for the first application is a request to rate or share the first application.

3. The method of claim 1, wherein:
   the previous user interactions comprise one or more ratings, by the user via one or more prompts, of the one or more second applications; and
   the causing of the user device to display the prompt is further responsive to determining a quantity of the one or more ratings meets a corresponding threshold quantity.

4. The method of claim 1, wherein the causing of the user device to display the prompt is further responsive to determining that a level of engagement of the user with the first application meets a threshold level.

5. The method of claim 1, wherein the previous user interactions comprise one or more ratings, by the user via one or more prompts, of the one or more second applications, and wherein the causing of the user device to display the prompt is further responsive to:
- generating a combined score based on the one or more ratings and a level of engagement of the user with the first application; and
- determining the combined score meets a threshold score.

6. The method of claim 1, further comprising:
- receiving user information corresponding to a plurality of users comprising the user; and
- clustering, based on the user information, a subset of the plurality of users comprising the user into a first cluster, wherein:
  - the previous user interactions comprise a first median positive interaction rate of the first cluster; and
  - the causing of the user device to display the prompt is further responsive to determining the first median positive interaction rate meets a threshold rate.

7. The method of claim 1, further comprising determining a level of impact for displaying the prompt to the user based on the previous user interactions, wherein:
- the level of impact comprises at least one of invasiveness of the prompt, size of the prompt, or location of the displaying of the prompt; and
- the causing the user device to display, to the user, the prompt is based on the level of impact.

8. A non-transitory machine-readable storage medium storing instructions which, when executed cause a processing device of a user device to perform operations comprising:
- identifying a first application for which a feedback of a user of the user device is desired;
- identifying previous user interactions with one or more second applications, wherein the one or more second applications are different from the first application, and wherein the previous user interactions comprise one or more negative interactions comprising at least one of: dismissing a corresponding prompt to rate the one or more second applications; or a rating for the one or more second applications that does not meet a threshold rating and that does not have an accompanying comment; and
- responsive to a quantity of negative interactions satisfying a threshold condition, causing the user device to display, to the user, a prompt for the feedback for the first application.

9. The non-transitory machine-readable storage medium of claim 8, wherein the prompt for the feedback for the first application is a request to rate or share the first application.

10. The non-transitory machine-readable storage medium of claim 8, wherein:
- the previous user interactions comprise one or more ratings, by the user via one or more prompts, of the one or more second applications; and
- the causing of the user device to display the prompt is further responsive to determining a quantity of the one or more ratings meets a corresponding threshold quantity.

11. The non-transitory machine-readable storage medium of claim 8, wherein the causing of the user device to display the prompt is further responsive to determining that a level of engagement of the user with the first application meets a threshold level.

12. The non-transitory machine-readable storage medium claim of 8, wherein the previous user interactions comprise one or more ratings, by the user via one or more prompts, of the one or more second applications, and wherein the causing of the user device to display the prompt is further responsive to:
- generating a combined score based on the one or more ratings and a level of engagement of the user with the first application; and
- determining the combined score meets a threshold score.

13. The non-transitory machine-readable storage medium of claim 8, the operations further comprising:
- receiving user information corresponding to a plurality of users comprising the user; and
- clustering, based on the user information, a subset of the plurality of users comprising the user into a first cluster, wherein:
  - the previous user interactions comprise a first median positive interaction rate of the first cluster; and
  - the causing of the user device to display the prompt is further responsive to determining the first median positive interaction rate meets a threshold rate.

14. The non-transitory machine-readable storage medium of claim 8, the operations further comprising determining a level of impact for displaying the prompt to the user based on the previous user interactions, wherein:
- the level of impact comprises at least one of invasiveness of the prompt, size of the prompt, frequency of the displaying of the prompt, timing of the displaying of the prompt, or location of the displaying of the prompt; and
- the causing of the user device to display, to the user, the prompt is based on the level of impact.

15. A system comprising:
- a memory; and
- a processing device, coupled to the memory, to:
  - identify a first application for which a feedback of a user of a user device is desired;
  - identify previous user interactions with one or more second applications, wherein the one or more second applications are different from the first application, and wherein the previous user interactions comprise one or more negative interactions comprising at least one of: dismissing a corresponding prompt to rate the one or more second applications; or a rating for the one or more second applications that does not meet a threshold rating and that does not have an accompanying comment; and
  - responsive to a quantity of negative interactions satisfying a threshold condition, cause the user device to display, to the user, a prompt for the feedback for the first application.

16. The system of claim 15, wherein the prompt for the feedback for the first application is a request to rate or share the first application.

17. The system of claim 15, wherein:
- the previous user interactions comprise one or more ratings, by the user via one or more prompts, of the one or more second applications; and
- to cause the user device to display the prompt, the processing device is to determine a quantity of the one or more ratings meets a corresponding threshold quantity.

18. The system of claim 15, wherein to cause the user device to display the prompt, the processing device is further to determine that a level of engagement of the user with the first application meets a threshold level.

19. The system of claim 15, wherein the previous user interactions comprise one or more ratings, by the user via one or more prompts, of the one or more second applications, and wherein to cause the user device to display the prompt, the processing device is further to:
    generate a combined score based on the one or more ratings and a level of engagement of the user with the first application; and
    determine the combined score meets a threshold score.

\* \* \* \* \*